(12) United States Patent
Stenberg et al.

(10) Patent No.: US 10,449,879 B2
(45) Date of Patent: Oct. 22, 2019

(54) PROTECTIVE REMOVABLE COVER

(71) Applicant: The Boeing Company, Chicago, IL (US)

(72) Inventors: Nathaniel James Stenberg, Seattle, WA (US); Robert James Fisher, Seattle, WA (US); Thomas Ralph Smith, Jr., Cocoa, FL (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 15/099,856

(22) Filed: Apr. 15, 2016

(65) Prior Publication Data

US 2017/0297466 A1    Oct. 19, 2017

(51) Int. Cl.
| | | |
|---|---|---|
| *B60N 2/00* | (2006.01) | |
| *B60N 2/60* | (2006.01) | |
| *B64D 11/06* | (2006.01) | |
| *B64F 5/50* | (2017.01) | |

(52) U.S. Cl.
CPC ......... *B60N 2/6018* (2013.01); *B60N 2/6009* (2013.01); *B64D 11/06* (2013.01); *B64F 5/50* (2017.01)

(58) Field of Classification Search
CPC ....... B60N 2/6009; B60N 2/6018; B64F 5/50; B64D 11/06
USPC ............................ 150/158; 297/228.1, 218.1
See application file for complete search history.

(56) References Cited

U.S. PATENT DOCUMENTS

| | | | | |
|---|---|---|---|---|
| 2,474,535 | A * | 6/1949 | Krannak ............... | A61F 13/105 15/227 |
| 2,637,031 | A * | 5/1953 | Friedman .............. | A61F 13/105 2/21 |
| 4,694,511 | A * | 9/1987 | Estes ........................ | A41D 7/00 2/67 |
| 5,005,243 | A | 4/1991 | Yip | |
| 5,028,472 | A * | 7/1991 | Gray ..................... | B60N 2/5833 150/158 |
| 5,743,157 | A * | 4/1998 | Hinze .................... | B21D 22/16 65/516 |
| 7,387,335 | B1 * | 6/2008 | Meek ..................... | A47C 31/11 297/228.1 |
| 7,686,392 | B2 * | 3/2010 | Kenny ................. | B60N 2/6018 297/188.06 |
| 7,780,232 | B2 * | 8/2010 | Miller .................... | A47C 31/11 297/224 |
| 8,010,856 | B2 * | 8/2011 | Cannon ............ | G01R 31/31853 714/726 |
| 9,155,397 | B2 * | 10/2015 | D'Amato ................. | A47C 7/66 |
| 2005/0055180 | A1 | 3/2005 | Pischke et al. | |
| 2006/0226682 | A1 * | 10/2006 | Lawson ................. | A47C 31/11 297/219.1 |
| 2009/0284056 | A1 * | 11/2009 | Chico .................. | A47C 31/113 297/228.1 |

(Continued)

*Primary Examiner* — Sue A Weaver
(74) *Attorney, Agent, or Firm* — Yee & Associates, P.C.

(57) ABSTRACT

A method and a protective removable cover are presented. The protective removable cover comprises a number of sheets of fabric joined together in a toroidal shape such that an interior of the toroidal shape and an exterior of the toroidal shape have a same surface. The number of sheets of fabric joined together in the toroidal shape is configured to roll over a monument such that the monument is substantially covered.

20 Claims, 10 Drawing Sheets

(56) References Cited

U.S. PATENT DOCUMENTS

| | | | | |
|---|---|---|---|---|
| 2011/0011762 A1* | 1/2011 | Hurst | ................. | B65D 33/2591 |
| | | | | 206/326 |
| 2012/0167347 A1* | 7/2012 | Bigajer | ................ | A41D 13/081 |
| | | | | 16/422 |
| 2015/0291071 A1* | 10/2015 | Thompson | ........... | B60N 2/6036 |
| | | | | 297/228.13 |

\* cited by examiner

PROTECTIVE REMOVABLE COVER

BACKGROUND INFORMATION

1. Field

The present disclosure relates generally to protecting surfaces of monuments, and in particular, to protective covers. Still more particularly, the present disclosure relates to protecting a monument using a protective removable cover.

2. Background

During manufacturing of platforms, monuments are built and installed. After installing a monument in a platform, surfaces of the monument may be undesirably affected. For example, as other components are installed and tested within the platform, the monument may be undesirably affected. In more detail, operators may inadvertently cause at least one of scratches, grease, dirt, fingerprints, or other undesirable conditions on the surfaces of the monument. Further, foreign object debris may be undesirably introduced to the monument. The undesirable affects to the monuments may increase costs due to cleaning or replacement of the monument or the surfaces of the monument.

In aircraft, monuments include seat banks. Currently, seat covers are used during manufacturing. Seat covers reduce damage from many sources throughout the building and maintenance of the aircraft. However, seats, and other interior monuments, have a plurality of different designs based on aircraft type, customer requests, and other standards. Keeping many different styles of seat covers on hand to use on the different types of seats in production is a burden for production lines based on at least one of cost, storage space, or locating and transporting specific designs of seat covers during the manufacturing. Therefore, it would be desirable to have a method and apparatus that takes into account at least some of the issues discussed above, as well as other possible issues.

SUMMARY

In one illustrative embodiment, a protective removable cover is presented. The protective removable cover comprises a number of sheets of fabric joined together in a toroidal shape such that an interior of the toroidal shape and an exterior of the toroidal shape have a same surface. The number of sheets of fabric joined together in the toroidal shape is configured to roll over a monument such that the monument is substantially covered.

In another illustrative embodiment, a method of protecting a monument is presented. A protective removable cover is rolled over the monument. The protective removable cover comprises a number of sheets of fabric joined together into a toroidal shape such that an interior of the toroidal shape and an exterior of the toroidal shape have a same surface. Rolling the protective removable cover comprises rolling the toroidal shape such that the same surface contacts the monument.

In yet another illustrative embodiment, a method is presented. A method of forming a protective removable cover comprising: joining a number of sheets of fabric to form a toroidal shape such that an interior of the toroidal shape and an exterior of the toroidal shape have a same surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that universal slip covers may be used on multiple types of seats. Universal slip covers are formed of nylon. Using a universal nylon slip cover for multiple different styles of seats is not ideal. Using a universal nylon slip cover may result in undesirable conditions. For example, a universal seat cover may have gapping or loose portions. Gapping or loose portions of a universal seat cover may cause a trip hazard for operators.

The illustrative embodiments also recognize and take into account that using either universal or specialized nylon slip covers may undesirably impact the surface of a monument.

For example, pulling nylon slip covers on and off of a monument may scratch decorative surfaces of the monument.

The illustrative embodiments further recognize and take into account that an aircraft is put through a variety of tests prior to delivery to a customer. Some of these tests include flight tests. The illustrative embodiments recognize and take into account that it is desirable to protect monuments during testing.

Figure 1:
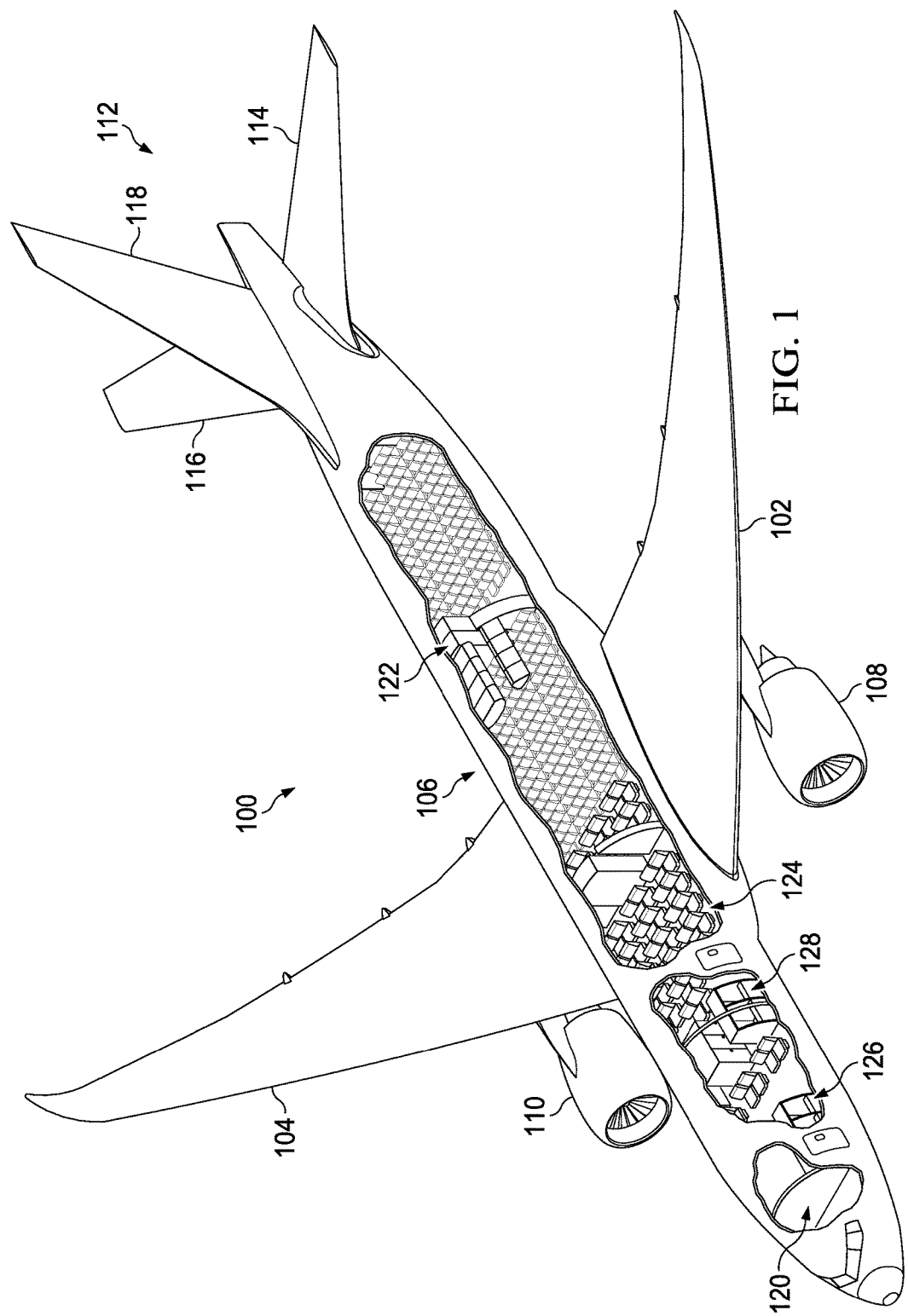
FIG. 1 is an illustration of an aircraft in which an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead compartments. Passenger cabin 122 also may include lavatory 126 and galley area 128. These two areas may be partitioned or separated from seating area 124 by a partitioning structure such as, for example, without limitation, a wall.

Protective removable covers in accordance with an illustrative embodiment may be used in aircraft 100 during manufacturing. For example, protective removable covers in accordance with an illustrative embodiment may be used to protect seats or other monuments in at least one of seating area 124, lavatory 126, or galley area 128.

As used herein, the phrase "at least one of," when used with a list of items, means different combinations of one or more of the listed items may be used, and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft. Also, other areas may be present in addition to seating area 124, lavatory 126, and galley area 128. Other areas may include, for example, without limitation, closets, storage areas, lounges, and other suitable areas for passenger seating. As another example, airplane seats within seating area 124 may be arranged differently from the depicted example. In other illustrative embodiments, some seats may be grouped into sets of single seats instead of three seats or pairs of seats as is illustrated in seating area 124.

Figure 2:
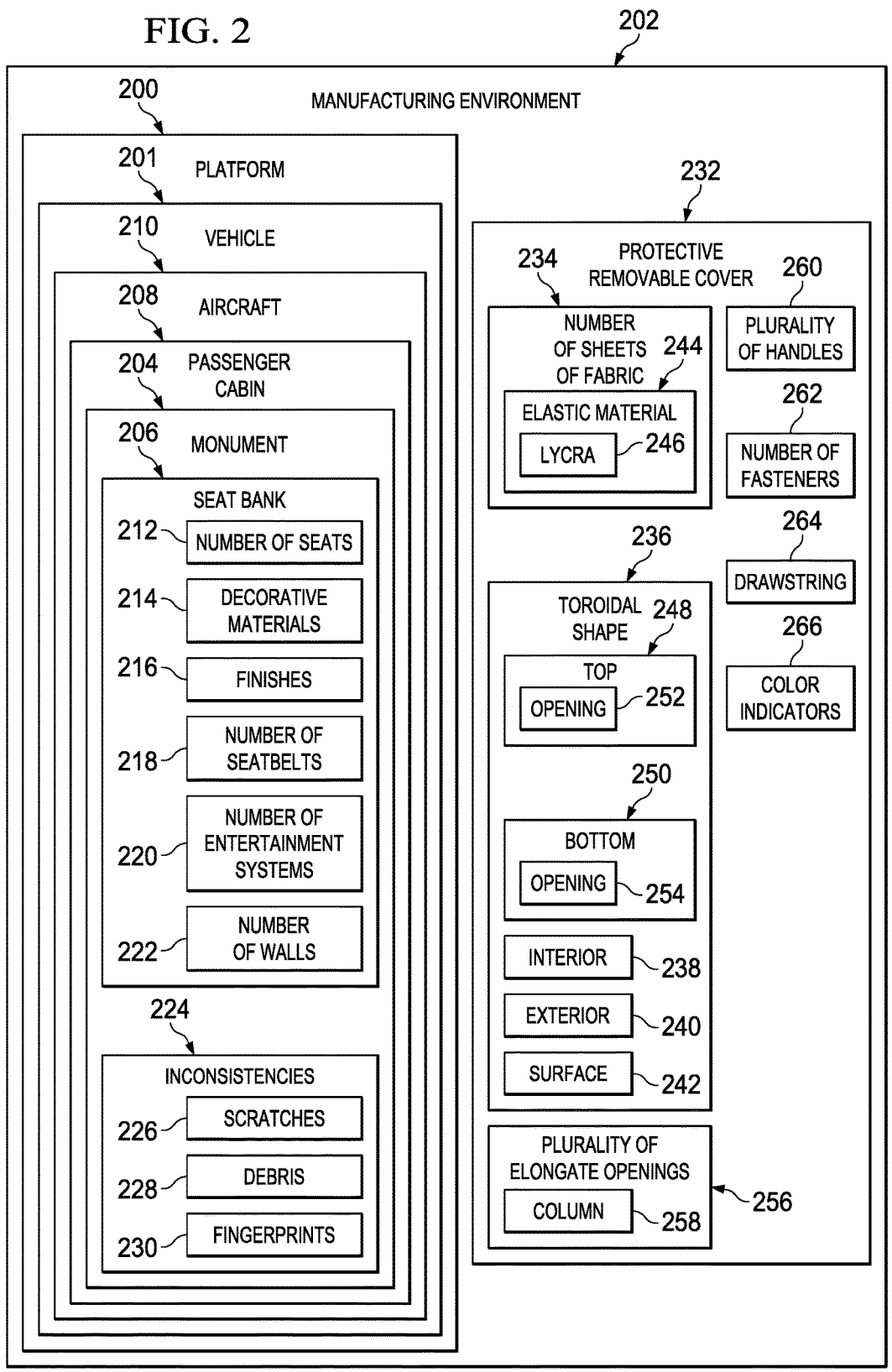
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In FIG. 2, platform 200 may be one implementation of aircraft 100 in FIG. 1. Although the illustrative examples for an illustrative embodiment are described with respect to an aircraft, an illustrative embodiment may be applied to other types of platforms. Platform 200 may be, for example, a mobile platform, a stationary platform, a land-based structure, an aquatic-based structure, and a space-based structure. More specifically, platform 200 may be a surface ship, a tank, a personnel carrier, a train, a spacecraft, a submarine, an automobile, a house, a manufacturing facility, a building, and other suitable platforms. In some illustrative examples, platform 200 may take the form of vehicle 201.

During manufacturing, a number of components is installed within platform 200 in manufacturing environment 202. The number of components installed in platform 200 includes monument 204. Monument 204 includes any desirable type of structure.

In some examples, monument 204 is seat bank 206 within passenger cabin 208 of aircraft 210. Seat bank 206 includes number of seats 212, decorative materials 214, finishes 216, and number of seatbelts 218. Decorative materials 214 and finishes 216 are selected by a customer. Decorative materials 214 include at least one of a metal, a polymer, a laminated wood, a composite, or any other desirable material. In some examples, finishes 216 include at least one of sheen, luster, or texture.

In some examples, seat bank 206 optionally includes at least one of number of entertainment systems 220 or number of walls 222. In one example, in business class or first class, number of seats 212 includes number of entertainment systems 220 in the backs of number of seats 212. In one example, in business class or first class, number of seats 212 is separated for privacy using number of walls 222.

Inconsistencies 224 may be introduced in monument 204 during manufacturing of platform 200 in manufacturing environment 202. Inconsistencies 224 include scratches 226, debris 228, fingerprints 230, or any other undesirable effects. Inconsistencies 224 may be introduced in at least one of decorative materials 214, finishes 216, number of entertainment systems 220, or number of walls 222. Accordingly, it is desirable to protect monument 204 from inconsistencies 224.

In manufacturing environment 202, protective removable cover 232 is installed over monument 204 to protect monument 204 from inconsistencies 224. Protective removable cover 232 comprises number of sheets of fabric 234 joined together into toroidal shape 236 such that interior 238 of toroidal shape 236 and exterior 240 of toroidal shape 236 have a same surface, surface 242. Number of sheets of fabric 234 joined together in toroidal shape 236 is configured to roll over monument 204 such that monument 204 is substantially covered.

Number of sheets of fabric 234 is formed of elastic material 244. In some examples, elastic material 244 is Lycra 246. As a result of number of sheets of fabric 234 being formed of elastic material 244, protective removable cover 232 stretches to deform over monument 204. Elastic material 244 of number of sheets of fabric 234 enables protective removable cover 232 to match features of monument 204.

Toroidal shape 236 may also be referred to as a continuous hollow cylindrical shape, a flattened donut shape, or a flattened tubular ring. Toroidal shape 236 has top 248 and bottom 250. Interior 238 and exterior 240 connect at top 248 and bottom 250 of toroidal shape 236. Because interior 238 and exterior 240 are both formed by surface 242, any desirable portion of surface 242 forms top 248. Further, toroidal shape 236 rolls in upon itself such that the portion of surface 242 that forms top 248 changes as toroidal shape 236 rolls in on itself.

Top 248 has opening 252 and bottom 250 has opening 254. Interior 238 of toroidal shape 236 connects opening 252 and opening 254.

Unlike conventional slipcovers, protective removable cover 232 may remain installed while portions of monument 204 are accessed. The portions of monument 204 can be accessed through at least one of opening 252 or opening 254 while protective removable cover 232 is installed over monument 204.

Number of sheets of fabric 234 is joined using any desirable method. In some illustrative examples, number of sheets of fabric 234 is joined using stretch stitching.

Protective removable cover 232 optionally includes plurality of elongate openings 256. When plurality of elongate openings 256 is present, plurality of elongate openings 256 is positioned in column 258 from top 248 of toroidal shape 236 to bottom 250 of toroidal shape 236. Each elongate opening of plurality of elongate openings 256 is substantially parallel to top 248 of toroidal shape 236.

In some examples, plurality of elongate openings 256 allows for protective removable cover 232 to stay over monument 204 during operation of platform 200. For example, when platform 200 is aircraft 210 and monument 204 is seat bank 206, number of seatbelts 218 is buckled through plurality of elongate openings 256 during test flights. As a result, protective removable cover 232 remains in place over seat bank 206 during test flights.

Further, plurality of elongate openings 256 may serve additional functions. In one example, plurality of elongate openings 256 is used to pull on protective removable cover 232 when installing protective removable cover 232 over monument 204. Further, portions of monument 204 may be accessed through plurality of elongate openings 256 for service or manufacturing. As another example, plurality of elongate openings 256 is used to align protective removable cover 232. Using plurality of elongate openings 256 to align protective removable cover 232 allows an operator to determine if protective removable cover 232 is twisted.

When plurality of elongate openings 256 is present in protective removable cover 232, each of plurality of elongate openings 256 is secured against pulling or unraveling. In one example, edges of plurality of elongate openings 256 are formed with stretch stitching.

Protective removable cover 232 optionally includes plurality of handles 260. Plurality of handles 260 is attached to number of sheets of fabric 234. When present, plurality of handles 260 is used to pull protective removable cover 232 over monument 204. Plurality of handles 260 is formed of any desirable material. Further, plurality of handles 260 is attached to number of sheets of fabric 234 in any desirable method.

Protective removable cover 232 optionally includes number of fasteners 262 attached to number of sheets of fabric 234 and associated with an opening of toroidal shape 236. The opening may be one of opening 252 or opening 254. When present, number of fasteners 262 is used to close at least one of opening 252 or opening 254 when protective removable cover 232 is installed over monument 204.

Protective removable cover 232 optionally includes drawstring 264. When present, drawstring 264 is used to close at least one of opening 252 or opening 254. When present, drawstring 264 is associated with an opening of toroidal shape 236.

Rather than using number of fasteners 262 or drawstring 264, in some illustrative examples, portions of protective removable cover 232 may be used to close at least one of opening 252 or opening 254. For example, a first portion of top 248 may be stretched over a second portion of top 248 to close opening 252. The nature of elastic material 244 holds the first portion of top 248 over the second portion of top 248.

Protective removable cover 232 optionally includes color indicators 266. When present, color indicators 266 aid in installation of protective removable cover 232 over monument 204. Color indicators 266 may provide help in appropriately positioning protective removable cover 232.

Protective removable cover 232 is stretched over monument 204 while in use. As a result, protective removable cover 232 partially takes its shape during implementation from monument 204. Due to protective removable cover 232 being formed from elastic material 244, portions of protective removable cover 232 may be stretched up to 10-15% in some portions.

When not in use, protective removable cover 232 may take up a desirable amount of space. For example, when not in use, protective removable cover 232 may be folded into any desirable size or shape.

Protective removable cover 232 may be any desirable size. In some examples, manufacturing environment 202 has a plurality of protective removable covers of the same size. In some examples, manufacturing environment 202 has a plurality of protective removable covers in at least two sizes.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although not depicted, monument 204 may take any desirable form. Monument 204 may be any desirable structure, such as storage bins, lavatories, or any other structure in vehicle 201. Further, although not depicted, protective removable cover 232 may be used to protect and store an object outside of manufacturing environment 202. For example, protective removable cover 232 may be used to protect and store consumer goods, such as strollers, car seats, bicycles, couches, furniture, appliances, motorcycles, cars, or any other desirable consumer goods.

Additionally, although plurality of elongate openings 256 is described as laid out as column 258, plurality of elongate openings 256 has any desirable shape, size, or location. For example, plurality of elongate openings 256 may be different for automobile uses than for use in aircraft 210. Further, plurality of elongate openings 256 may be laid out to dissipate heat. If monument 204 includes electronics or other heat sources, at least a portion of plurality of elongate openings 256 dissipate heat.

As another example, optional advertising may be attached to protective removable cover 232. In some examples, advertising may be permanently affixed to protective removable cover 232 to depict a specific customer. In other examples, advertising may be temporarily affixed to protective removable cover 232 using Velcro or other temporary attachment materials.

Figure 3:
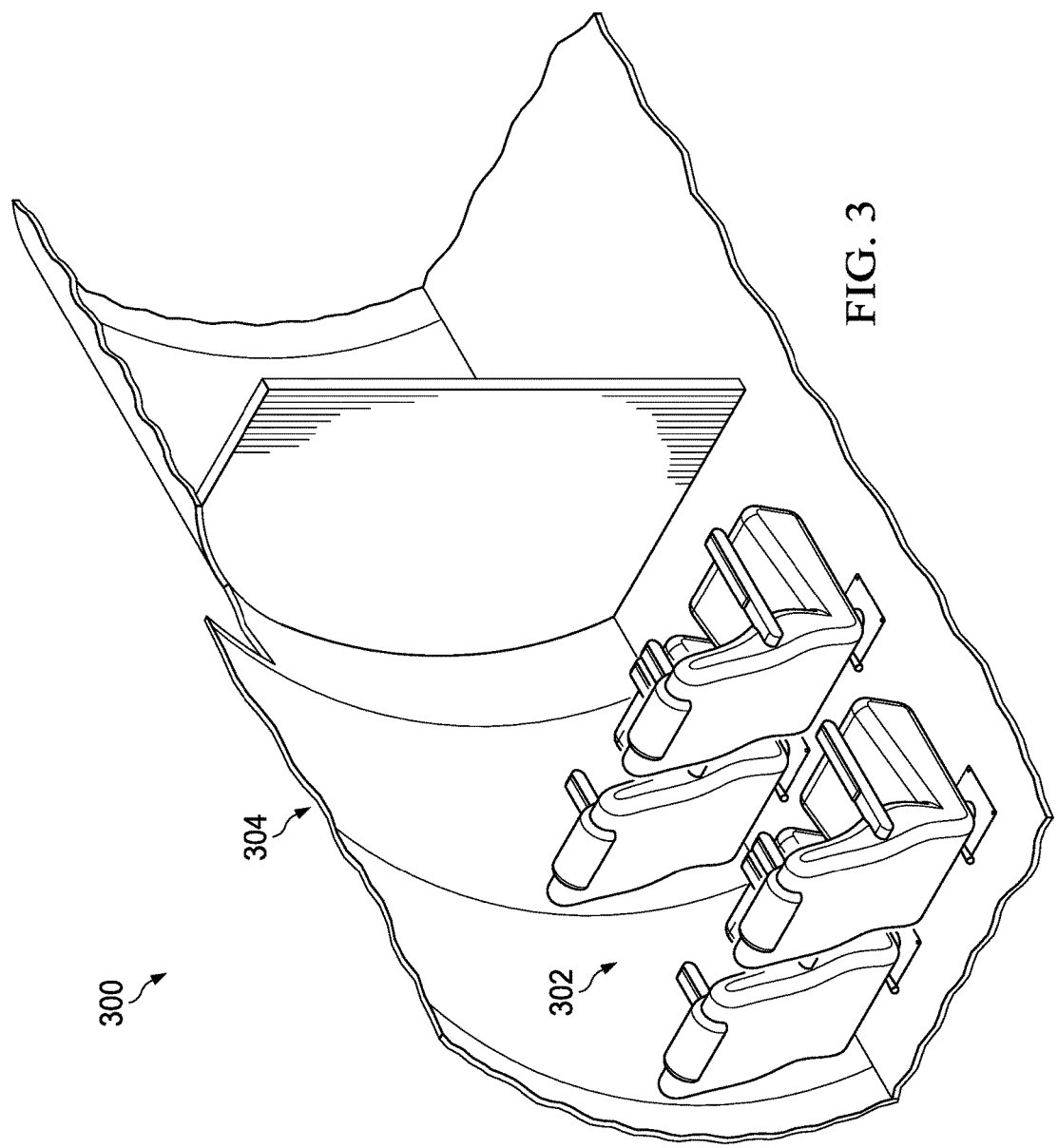
FIG. 3 is an illustration of an isometric view of a passenger cabin in which a protective removable cover may be used in accordance with an illustrative embodiment.

Turning now to FIG. 3, an illustration of an isometric view of a passenger cabin in which a protective removable cover may be used is depicted in accordance with an illustrative embodiment. Passenger cabin 300 is a physical implementation of a part of passenger cabin 208 of FIG. 2. In some examples, passenger cabin 300 is a portion of passenger cabin 122 of FIG. 1.

Passenger cabin 300 includes seat bank 302 and seat bank 304. During manufacturing, inconsistencies may be introduced to one of seat bank 302 or seat bank 304.

Figure 4:
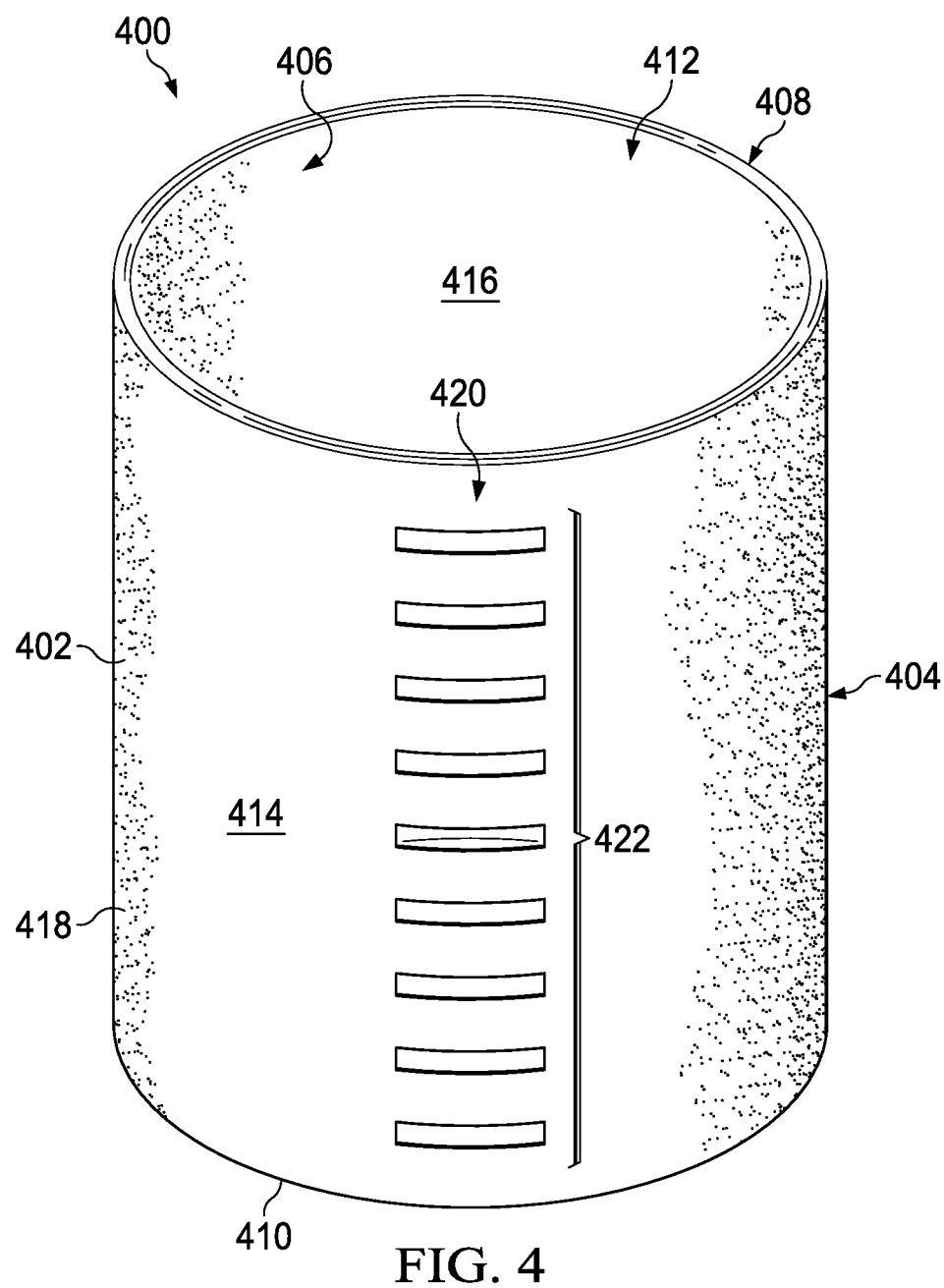
FIG. 4 is an illustration of an isometric view of a protective removable cover in accordance with an illustrative embodiment.

Turning now to FIG. 4, an illustration of an isometric view of a protective removable cover is depicted in accordance with an illustrative embodiment. Protective removable cover 400 is a physical implementation of protective removable cover 232 of FIG. 2. Protective removable cover 400 may be rolled over any desirable monument, such as monument 204 of FIG. 2. Protective removable cover 400 may be used within aircraft 100 of FIG. 1 or passenger cabin 300 of FIG. 3.

Protective removable cover 400 has toroidal shape 402. Although, as depicted, toroidal shape 402 appears to be perfectly cylindrical, in some examples, toroidal shape 402 may not have circular openings.

Toroidal shape 402 has exterior 404, interior 406, top 408, and bottom 410. As depicted, top 408 has opening 412. Surface 414 of exterior 404 and surface 416 of interior 406 are a same surface. More specifically, number of sheets of fabric 418 forming protective removable cover 400 is joined such that surface 414 and surface 416 have the same or similar characteristics.

For example, sheets of fabric often have a "smooth side" and a "rough side" or a "front" and a "back." In some examples, number of sheets of fabric 418 is joined together such that only the "smooth side" creates exterior 404 and interior 406 of toroidal shape 402. By having "smooth side" as exterior 404 and interior 406, features of a monument are not undesirably affected by protective removable cover 400. A "smooth side" may not scratch or undesirably effect finishes of materials such as laminate wood, wood, or metal.

In some other examples, number of sheets of fabric 418 is joined together such that only the "rough side" creates exterior 404 and interior 406 of toroidal shape 402. By having "rough side" as exterior 404 and interior 406, protective removable cover 400 may be desirably rolled over some monuments. For example, monuments with fabric coverings, such as furniture, may be desirably covered with protective removable cover 400 with a "rough side."

As depicted, protective removable cover 400 includes plurality of elongate openings 420. As depicted, plurality of elongate openings 420 is arranged in column 422. As depicted, each opening of plurality of elongate openings 420 is parallel to top 408. Plurality of elongate openings 420 may be used to access portions of a monument when protective removable cover 400 is installed over the monument. Plurality of elongate openings 420 may be used to roll protective removable cover 400.

Figure 5:
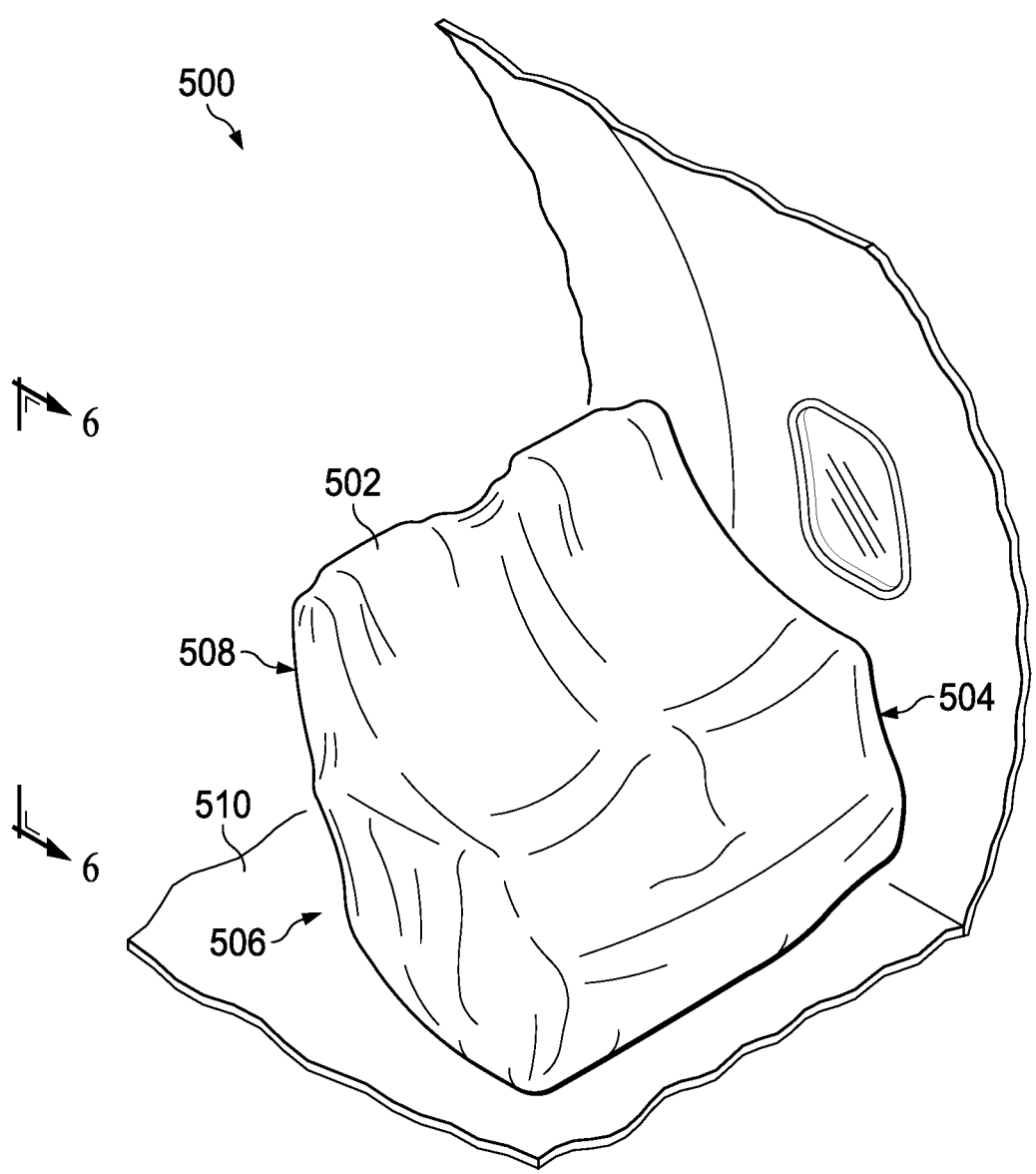
FIG. 5 is an illustration of an isometric view of a protective removable cover in use in a passenger cabin in accordance with an illustrative embodiment.

Turning now to FIG. 5, an illustration of an isometric view of a protective removable cover in use in a passenger cabin is depicted in accordance with an illustrative embodiment. In view 500, protective removable cover 502 is installed over substantially all of monument 504. As depicted, monument 504 takes the form of seat bank 506. Protective removable cover 502 is rolled onto seat bank 506 to protect seat bank 506 from inconsistencies, such as scratches, debris, or other undesirable effects. By rolling protective removable cover 502 onto seat bank 506, material of protective removable cover 502 slides over itself. By rolling protective removable cover 502 onto seat bank 506, protective removable cover 502 does not slide over seat bank 506. As a result, protective removable cover 502 does not build up friction on surfaces of seat bank 506.

Protective removable cover 502 is a physical implementation of protective removable cover 232 of FIG. 2. In some examples, protective removable cover 502 may be the same as protective removable cover 400 of FIG. 4. In other examples, protective removable cover 502 is different from protective removable cover 400 of FIG. 4.

Protective removable cover 502 is formed of number of sheets of fabric 508. Number of sheets of fabric 508 is formed of an elastic material. Accordingly, protective removable cover 502 stretches as protective removable cover 502 is installed over seat bank 506.

Protective removable cover 502 covers substantially all of seat bank 506. Protective removable cover 502 is form fitting to floor 510. Accordingly, protective removable cover 502 is not a trip hazard.

Figure 6:
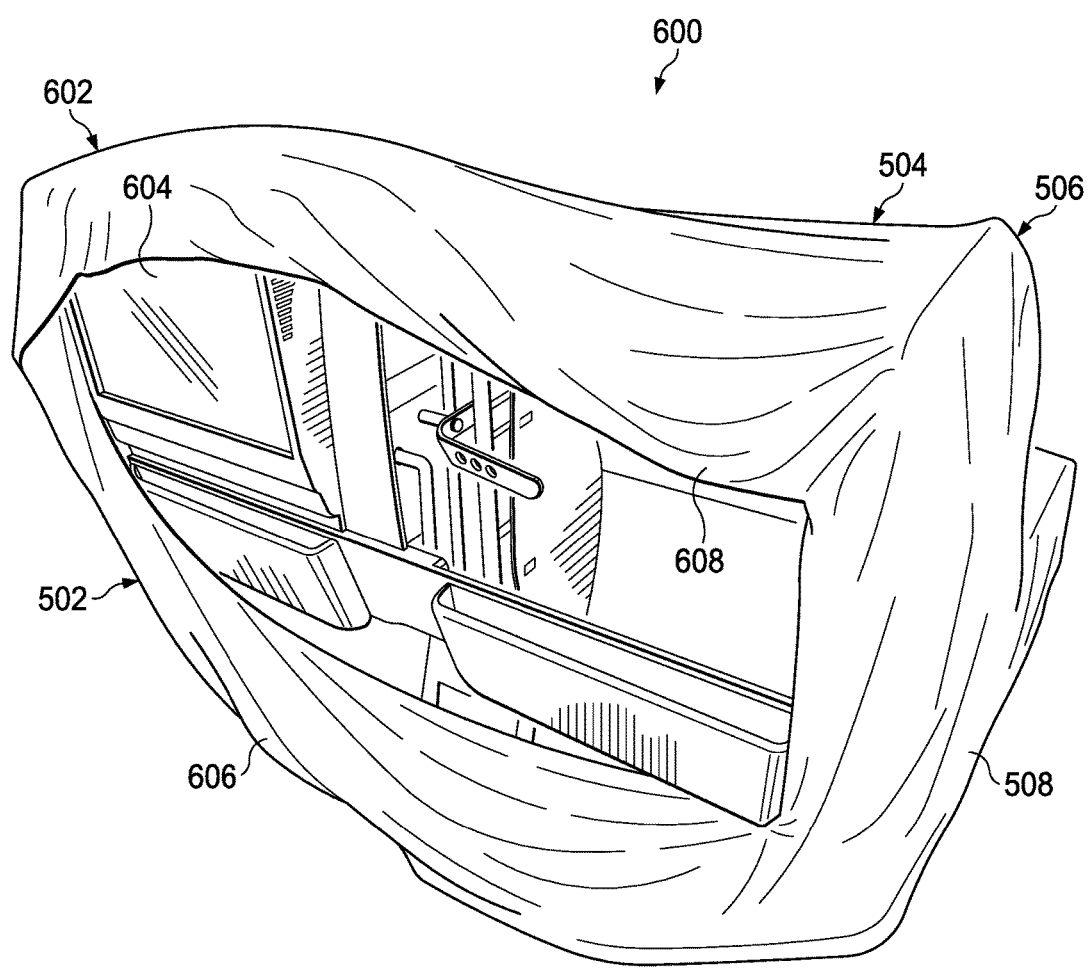
FIG. 6 is an illustration of a back view of a protective removable cover in use in a passenger cabin in accordance with an illustrative embodiment.

Turning now to FIG. 6, an illustration of a back view of a protective removable cover in use in a passenger cabin is depicted in accordance with an illustrative embodiment. View 600 is a view from direction 6 of FIG. 5.

In view 600, top 602 of protective removable cover 502 is open to allow access to number of entertainment systems 604. Number of entertainment systems 604 is positioned in the back of seat bank 506.

Although top 602 of protective removable cover 502 is open to expose number of entertainment systems 604, in some examples, top 602 may be closed. In some examples, top 602 is closed by pulling portion 606 over portion 608. In these examples, the elastic properties of number of sheets of fabric 508 holds top 602 closed. In other examples, at least one of a number of fasteners or a drawstring is used to close top 602.

Figure 7:
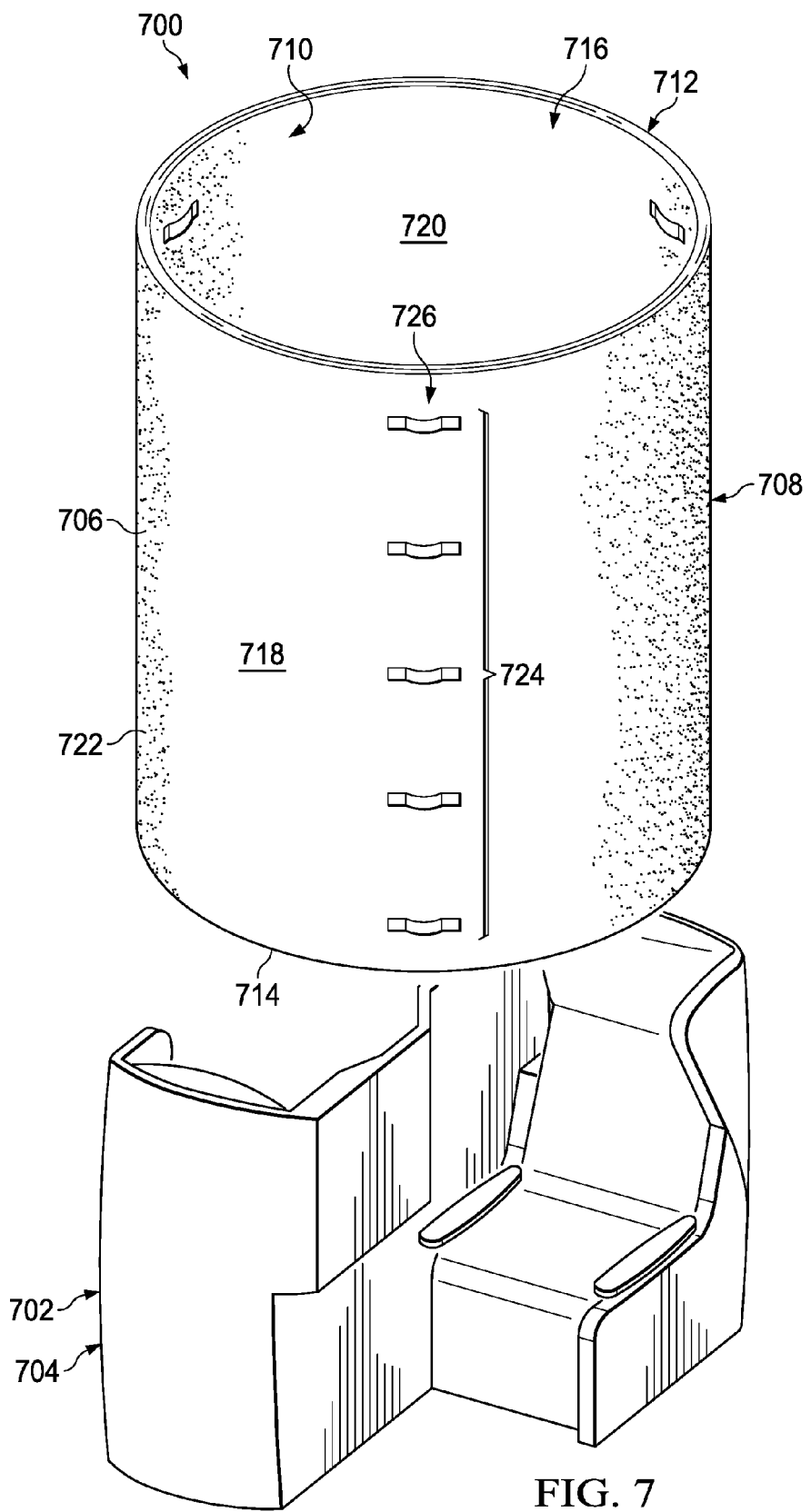
FIG. 7 is an illustration of an isometric view of a protective removable cover prior to installation in accordance with an illustrative embodiment.

Turning now to FIG. 7, an illustration of an isometric view of a protective removable cover prior to installation is depicted in accordance with an illustrative embodiment. Protective removable cover 700 is a physical implementation of protective removable cover 232 of FIG. 2. Protective removable cover 700 may be rolled over any desirable monument, such as monument 702. As depicted, monument 702 is seat bank 704. Seat bank 704 is a physical implementation of seat bank 206 of FIG. 2. Seat bank 704 may be used within aircraft 100 of FIG. 1.

Protective removable cover 700 has toroidal shape 706. Although, as depicted, toroidal shape 706 appears to be perfectly cylindrical, in some examples, toroidal shape 706 may not have circular openings.

Toroidal shape 706 has exterior 708, interior 710, top 712, and bottom 714. As depicted, top 712 has opening 716. Surface 718 of exterior 708 and surface 720 of interior 710 are a same surface. More specifically, number of sheets of fabric 722 forming protective removable cover 700 is joined such that surface 718 and surface 720 have the same or similar characteristics. In some examples, number of sheets of fabric 722 is joined together such that only the "smooth side" creates exterior 708 and interior 710 of toroidal shape 706.

As depicted, protective removable cover 700 includes plurality of handles 724. As depicted, plurality of handles 724 is arranged in column 726 on exterior 708. As depicted, plurality of handles 724 also includes handles on interior 710. Plurality of handles 724 may be used to roll protective removable cover 700 onto monument 702.

Figure 8:
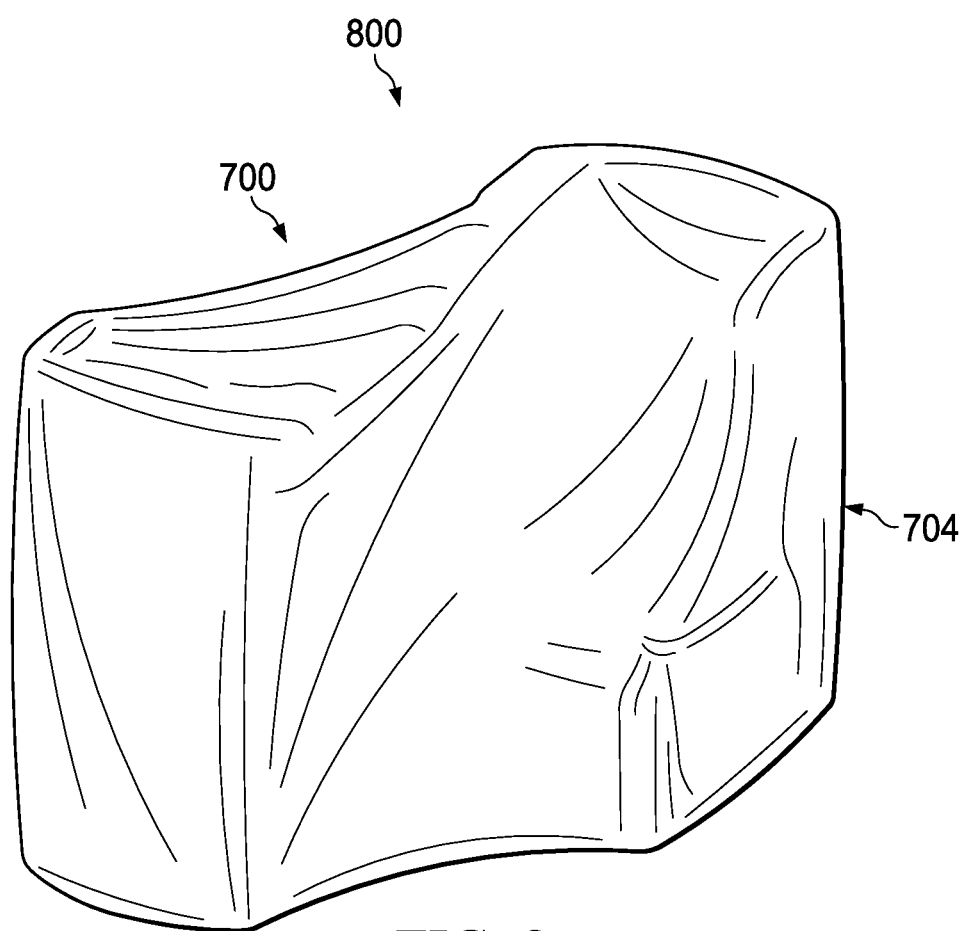
FIG. 8 is an illustration of a protective removable cover installed over a seat bank in accordance with an illustrative embodiment.

Turning now to FIG. 8, an illustration of a protective removable cover installed over a seat bank is depicted in accordance with an illustrative embodiment. View 800 is a view of protective removable cover 700 rolled over seat bank 704 of FIG. 7.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 can be implemented as physical structures.

Figure 9:
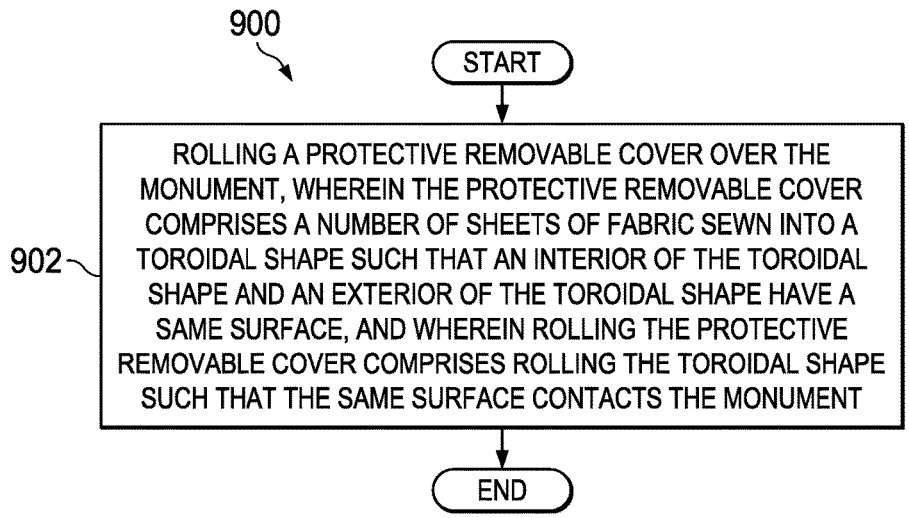
FIG. 9 is an illustration of a flowchart of a method for protecting a monument in accordance with an illustrative embodiment.

Turning now to FIG. 9, an illustration of a flowchart of a method for protecting a monument is depicted in accordance with an illustrative embodiment. Protecting monuments in aircraft 100 of FIG. 1 may use process 900. Process 900 is a method for protecting monument 204 of FIG. 2. Process 900 may protect a monument, such as seat bank 302 of FIG. 3, seat bank 506 of FIGS. 5 and 6, or seat bank 704 of FIGS. 7 and 8. Process 900 uses a protective removable cover, such as protective removable cover 400 of FIG. 4, protective removable cover 502 of FIGS. 5 and 6, or protective removable cover 700 of FIGS. 7 and 8.

Process 900 rolls a protective removable cover over the monument, wherein the protective removable cover comprises a number of sheets of fabric joined together into a toroidal shape such that an interior of the toroidal shape and an exterior of the toroidal shape have a same surface. Rolling the protective removable cover comprises rolling the toroidal shape such that the same surface contacts the monument (operation 902). Afterwards, the process terminates.

In some illustrative examples, rolling the protective removable cover over the monument comprises pulling on at least one of a plurality of elongate openings positioned in a column from a top of the toroidal shape to a bottom of the toroidal shape. In some examples, rolling the protective removable cover over the monument comprises pulling on at least one of a plurality of handles attached to the number of sheets of fabric.

Figure 10:
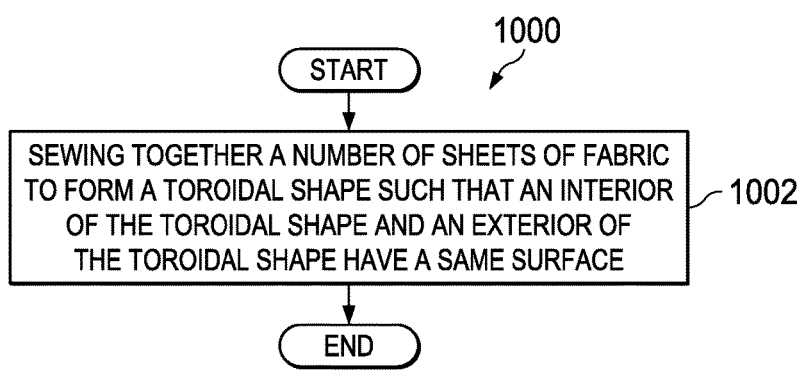
FIG. 10 is an illustration of a flowchart of a method for forming a protective removable cover in accordance with an illustrative embodiment.

Turning now to FIG. 10, an illustration of a flowchart of a method for forming a protective removable cover is depicted in accordance with an illustrative embodiment. Process 1000 forms a protective removable cover, such as protective removable cover 232 of FIG. 2, protective removable cover 400 of FIG. 4, protective removable cover 502 of FIGS. 5 and 6, or protective removable cover 700 of FIGS. 7 and 8.

Process 1000 joins a number of sheets of fabric to form a toroidal shape such that an interior of the toroidal shape and an exterior of the toroidal shape have a same surface (operation 1002). The toroidal shape is configured to roll over a monument such that the monument is substantially covered. Afterwards, the process terminates.

In some illustrative examples, joining the number of sheets of fabric comprises forming a number of stretch stitches in an elastic fabric. In other illustrative examples, process 1000 further comprises forming a plurality of elongate openings positioned in a column from a top of the toroidal shape to a bottom of the toroidal shape.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in process 900, the monument is a seat bank on a vehicle. In this example, process 900 further comprises pulling a seat belt of the seat bank through at least one of a plurality of elongate openings positioned in a column from a top of the toroidal shape to a bottom of the toroidal shape.

In another example, process 900 further comprises closing an opening of the toroidal shape after rolling the protective removable cover over the monument. In some examples, closing the opening of the toroidal shape includes at least one of pulling a drawstring, fastening a number of fasteners, or pulling a first portion of the toroidal shape over a second portion of the toroidal shape.

In some examples, process 900 further comprises accessing a component of the monument through an opening of the toroidal shape. As another example, the monument is a component of a vehicle, and process 900 further comprises operating the vehicle while the toroidal shape covers the monument.

Figure 11:
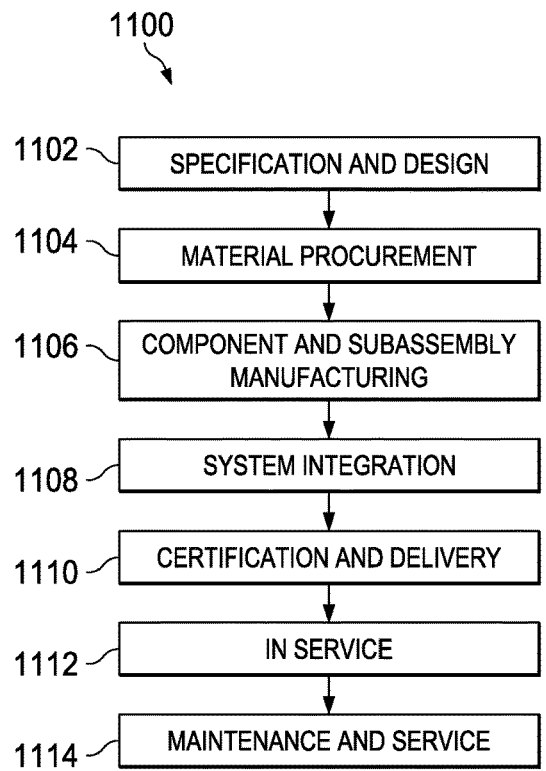
FIG. 11 is an illustration of an aircraft manufacturing and service method in the form of a block diagram in accordance with an illustrative embodiment.
Figure 12:
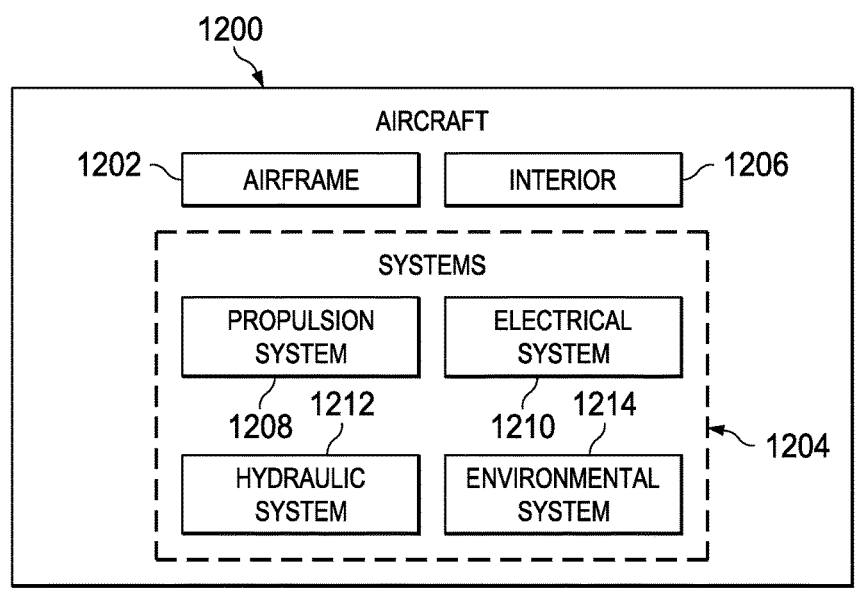
FIG. 12 is an illustration of an aircraft in the form of a block diagram in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Although an aerospace example is shown, different illustrative embodiments may be applied to other industries, such as the automotive industry.

Apparatuses and methods embodied herein may be employed during at least one of the stages of aircraft manufacturing and service method 1100 of FIG. 11. One or more illustrative embodiments may be used during component and subassembly manufacturing 1106. For example, protective removable cover 232 of FIG. 2 may be installed over a monument to protect the monument from inconsistencies during component and subassembly manufacturing 1106 of FIG. 11. Further, protective removable cover 232 may be installed over a monument to protect the monument from inconsistencies during maintenance and service 1114 of FIG. 11.

The illustrative embodiments provide a method and apparatus for protecting a monument from inconsistencies using a protective removable cover. The protective removable cover can stretch to fit the profile of any seat type in production today.

The protective removable cover is applied to the monument without any friction occurring between the monument and the protective removable cover. Application without friction eliminates potential abrasive damage to the monument. The protective removable cover design inherently has a void at the top, which allows heat from normal monument operation to vent. Allowing the heat to vent eliminates the potential for electrical overheating during functional tests. The protective removable cover design can be quickly applied and removed. Further, the protective removable cover may be collapsed to minimize storing volumes.

The protective removable cover design protects with two layers of flexible fabric. The protective removable cover forms to the shape of the monument it protects, and does not require a large footprint or straps, features that may create trip hazards while in use during production. The protective removable cover design may offer better impact resistance than currently used nylon "one size fits all" type of seat covers in use today.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A protective removable cover comprising:
a number of sheets of fabric joined together in a toroidal shape such that an interior of the toroidal shape and an exterior of the toroidal shape have a same surface, wherein the number of sheets of fabric joined together in the toroidal shape is configured to roll over a monument such that the monument is substantially covered.

2. The protective removable cover of claim 1, wherein the number of sheets of fabric is formed of an elastic material.

3. The protective removable cover of claim 2, wherein the elastic material is Lycra.

4. The protective removable cover of claim 1, wherein the number of sheets of fabric is joined using stretch stitching.

5. The protective removable cover of claim 1 further comprising:
a plurality of elongate openings positioned in a column from a top of the toroidal shape to a bottom of the toroidal shape.

6. The protective removable cover of claim 5, wherein the plurality of elongate openings is substantially parallel to the top of the toroidal shape.

7. The protective removable cover of claim 1 further comprising:
a plurality of handles attached to the number of sheets of fabric.

8. The protective removable cover of claim 1 further comprising:
a number of fasteners attached to the number of sheets of fabric and associated with an opening of the toroidal shape.

9. The protective removable cover of claim 1 further comprising:
a drawstring associated with an opening of the toroidal shape.

10. A method of protecting a monument comprising:
rolling a protective removable cover over the monument, wherein the protective removable cover comprises a number of sheets of fabric joined together into a toroidal shape such that an interior of the toroidal shape and an exterior of the toroidal shape have a same surface, and wherein rolling the protective removable cover comprises rolling the toroidal shape such that the same surface contacts the monument.

11. The method of claim 10, wherein the monument is a seat bank on a vehicle, the method further comprising:
pulling a seat belt of the seat bank through at least one of a plurality of elongate openings positioned in a column from a top of the toroidal shape to a bottom of the toroidal shape.

12. The method of claim 10, wherein rolling the protective removable cover over the monument comprises:
pulling on at least one of a plurality of elongate openings positioned in a column from a top of the toroidal shape to a bottom of the toroidal shape.

13. The method of claim 10, wherein rolling the protective removable cover over the monument comprises:
pulling on at least one of a plurality of handles attached to the number of sheets of fabric.

14. The method of claim 10 further comprising:
closing an opening of the toroidal shape after rolling the protective removable cover over the monument.

15. The method of claim 14, wherein closing the opening of the toroidal shape includes at least one of pulling a drawstring, fastening a number of fasteners, or pulling a first portion of the toroidal shape over a second portion of the toroidal shape.

16. The method of claim 10 further comprising:
accessing a component of the monument through an opening of the toroidal shape.

17. The method of claim 10, wherein the monument is a component of a vehicle, and wherein the method further comprises:
operating the vehicle while the toroidal shape covers the monument.

18. A method of forming a protective removable cover comprising:
joining a number of sheets of fabric to form a toroidal shape such that an interior of the toroidal shape and an exterior of the toroidal shape have a same surface; and forming a plurality of elongate openings positioned in a column from a top of the toroidal shape to a bottom of the toroidal shape.

19. The method of claim 18, wherein joining the number of sheets of fabric comprises forming a number of stretch stitches in an elastic material.

20. The method of claim 18, further comprising:
forming a plurality of handles attached to the number of sheets of fabric.

* * * * *